United States Patent [19]

Werth

[11] Patent Number: 5,690,902

[45] Date of Patent: *Nov. 25, 1997

[54] HYDROGEN-POWERED AUTOMOBILE WITH IN SITU HYDROGEN GENERATION

[75] Inventor: John Werth, Princeton, N.J.

[73] Assignee: H Power Corporation, Belleville, N.J.

[*] Notice: The term of this patent shall not extend beyond the expiration date of Pat. No. 5,510,201.

[21] Appl. No.: 477,520

[22] Filed: Jun. 7, 1995

Related U.S. Application Data

[63] Continuation-in-part of Ser. No. 52,561, Apr. 23, 1993, abandoned.

[51] Int. Cl.[6] ............................................. C01B 3/08
[52] U.S. Cl. .................... 423/658; 123/3; 123/DIG. 12
[58] Field of Search ............................ 123/3, DIG. 12; 423/658

[56] References Cited

U.S. PATENT DOCUMENTS

| | | | |
|---|---|---|---|
| 5,085,176 | 2/1992 | Brinkley, III | 123/3 |
| 5,438,961 | 8/1995 | Peschka et al. | 123/3 |
| 5,462,021 | 10/1995 | Minami et al. | 123/3 |
| 5,513,600 | 5/1996 | Teves | 123/3 |

FOREIGN PATENT DOCUMENTS

| | | | |
|---|---|---|---|
| 479307 | 12/1951 | Canada | 423/658 |
| 119591 | 10/1918 | United Kingdom | 423/658 |
| 424622 | 5/1933 | United Kingdom | 423/658 |
| 527243 | 10/1940 | United Kingdom | 423/658 |

*Primary Examiner*—Wayne Langel
*Attorney, Agent, or Firm*—Salzman & Levy

[57] ABSTRACT

The new iron material and catalyst admixture of this invention feature a method for operating an automotive vehicle that is designed to internally combust hydrogen generated in situ aboard the vehicle. The method of the invention utilizes hydrogen from an onboard reactor to power an automotive vehicle. Hydrogen from the onboard reactor is generated by a bed of iron that is made to react with $H_2O$ in the presence of an alkali hydroxide catalyst at temperatures not exceeding approximately 250° C. The preferred alkali hydroxide is the hydroxide of potassium in a range of concentrations between 50 to 60 percent by weight, with the preferred concentration being about 53%. The iron materials of this invention may comprise in situ freshly-ground particulates as an added enhancement for the reactivity between the iron and $H_2O$. The particles range in diameter size from approximately 25 to 1,200 μm, with an average-sized distribution having at least twenty percent (20%) of the particles less than 300 μm in diameter. It is preferable that at least 50% are less than 300 μm in diameter. The average particle density ranges from approximately 1 to 7.8 g/cc, with a non-compressed packed particle density ranging from about 1.5 to 3.5 g/cc. The particles have a surface area greater than approximately 0.001 meters²/g.

18 Claims, 2 Drawing Sheets

HYDROGEN-POWERED AUTOMOBILE WITH IN SITU HYDROGEN GENERATION

RELATED PATENT APPLICATION

This patent application is a continuation-in-part of PCT application, PCT/US 9,303,825 (which was filed Apr. 23, 1993); and the U.S. patent application, Ser. No. 08/052,561 (which was also filed Apr. 23, 1993), abandoned. Each was assigned to a common assignee.

FIELD OF THE INVENTION

The present invention pertains to a hydrogen-generating process used to power automotive vehicles wherein water is passed over a bed of iron material and, more particularly, to a new, catalyzed method of generating hydrogen in situ within an automobile, one that utilizes lower-than-normal temperatures when the water reacts with the iron material.

BACKGROUND OF THE INVENTION

The generation of hydrogen by passing steam at or about 700° C. over a bed of iron is well known in the art. It is generally a simple way of obtaining hydrogen, which is drawn off and dried. One of the primary uses of hydrogen can be for powering land vehicles and, in particular, automobiles having heat engines designed to run on hydrogen. This type of vehicle provides several advantages, one of which is the absence of hydrocarbon and carbon monoxide exhaust pollutants.

The electrical automobile is currently under intense development due to the twin needs to reduce air pollution and conserve fuel resources. One of the major difficulties in the development of the electrical automobile is supplying the power for the electrical drive motors. Such power is currently furnished by batteries. Present battery technology, however, is not capable of providing the energy needed to run the automobile over extended distances at an affordable cost.

This invention shows that hydrogen can be generated in situ (i.e., onboard a vehicle) at a low cost. This hydrogen thus generated is then used to power an automotive engine.

One well-known method, no longer in use, of hydrogen generation is to generate hydrogen by passing high-temperature steam over a bed of iron. This method can be too expensive and impractical for automotive purposes. The containers needed to generate, supply and contain the high-temperature steam can make the cost of running the vehicle too expensive. Further, the use of high-temperature steam can be dangerous.

The present invention is the development of a new hydrogen-generating process utilizing either low-temperature steam or liquid water. Being able to use a low-temperature process in vehicles is valuable, since it is quite practical. In the first instance, the need to expend energy in bringing water or steam to a high temperature is eliminated. Secondly, a process that does not use high-temperature steam is inherently safer; it also does not require special pressure fittings and piping. Thirdly, the utilization of high temperatures almost always results in reactors that are large and heavy, since insulation is usually required to prevent heat loss; obviously, the added weight and space of large reactors are extremely detrimental in producing a low-cost, efficient automobile.

The low-temperature process of this invention is made possible by a unique catalyst, which greatly enhances the $H_2O$ and iron reaction. The catalyst of this invention comprises an alkaline hydroxide and, more particularly, the preferred hydroxide of potassium.

In addition to the distinctive catalyst of this invention, it is additionally contemplated that an alternative process of hydrogen generation may be obtained by using a more active form of iron, to wit, freshly-ground particles of iron which increase the efficiency thereof. Such active iron is able to react at high rates with water at lower-than-normal temperatures without catalysis. This alternative active-iron process embodiment may also be combined with the catalysis process, thus providing yet a third process.

The iron particles of the active-iron process are ground when the vehicle is initially powered and throughout vehicular operation. The instantaneous grinding of the iron particles in situ is beneficial because iron in moist air becomes rapidly oxidized after grinding. (As early as fifteen minutes after grinding, iron will lose its enhanced reactivity when exposed to moist air.) Therefore, after the initial grinding, more iron should be ground periodically onboard the vehicle or, alternatively, freshly-ground iron fuel charges can be injected from sealed packets.

The freshly-ground reactive iron is easily deposited in a compartment in the vehicle. It is easily handled as sealed packet(s) of freshly-ground particulates, but, additionally, it can be freshly ground in situ aboard the vehicle. The particles range in diameter size from approximately 25 to 1,200 µm; an average-sized distribution is one in which at least twenty percent (20%) of the particles are less than 300 µm in diameter. It is preferable that at least 50% are less than 300 µm in diameter. The average particle density ranges approximately from about 1 to 7.8 g/cc, with a non-compressed packed particle density ranging from about 1.5 to 3.5 g/cc. The particles have a surface area greater than approximately 0.001 meters$^2$/g.

The potassium hydroxide catalyst of this invention is truly unique. As the hydrogen generation of iron and steam is very old, one would expect that such a temperature-reducing catalyst would have been discovered a long time ago. It is also unusual since many compounds and materials have been tried, without much success.

The potassium hydroxide catalyst of this invention makes possible low-temperature reactors operating at or about 200° C. to 250° C.; hydrogen can be produced at high rates thereby without requiring large amounts of iron in the reactor. A low-temperature reaction of this type would normally require impractical amounts of iron in order to generate enough hydrogen at the usual low activity. However, this catalyst greatly enhances the rate of reaction between $H_2O$ and iron, thus reducing the amount of iron needed for reaction with the water. For example, when using high-temperature steam for the hydrogen generation, a medium-sized hydrogen-powered car which has its power generated by a standard heat engine (such as an Otto cycle engine) might consume about 50 pounds of iron during a one-hour trip. In order to obtain the same amount of hydrogen from a steam reaction at 250° C., more than 400 pounds of heated iron would be required under present state-of-the-art methods; only about 50 pounds would actually react to form hydrogen. The added weight of the iron reduces mileage. The additional 350 pounds of iron would then need the requisite heat to bring it to operating temperature. In other words, the additional 350 pounds of iron would be nothing short of excess baggage. The need to carry and heat more iron than is stoichiometrically required, is completely impractical.

To the best of Applicant's knowledge, no catalyst has been shown to be effective, practical and economical in

3 accelerating the iron-water reaction at temperatures less than 400° C. Catalysts that have been tried without success include sodium chloride, sodium sulfate, zinc sulfate, zinc chloride, potassium sulfate, potassium chloride, lithium bromide, calcium chloride, potassium stannate, ferrous and ferric sulfate, ferrous chloride and ferric chloride.

The preferred concentration of the potassium hydroxide catalyst of this invention is approximately 53 grams of potassium hydroxide per 100 grams of solution.

At this concentration, operating at 230° C., a given quantity of iron reacts with water to form iron oxide at a per-minute conversion rate of 3.6%. This rapid conversion rate makes practical the use of iron to fuel automobiles and other land vehicles.

It should be understood that while the other alkali hydroxides are effective catalysts, the use of the hydroxide of potassium is preferred. The hydroxides of cesium, rubidium and lithium are too expensive. The hydroxides of sodium and lithium form excessively stable ferrates with the iron, which is undesirable, because stable ferrates are difficult to decompose. They also reduce the amount of catalyst in solution. The formation of the excessively stable ferrates, therefore, poses problems in the replenishment of the catalyst, with attendant inconvenience and the additional costs of labor and materials.

SUMMARY OF THE INVENTION

In accordance with the new iron material and catalyst processes of this invention, there is also provided a method for hydrogen generation in situ aboard an automobile. The processes power a vehicle having a modified heat engine (such as an Otto cycle engine) that is designed to run on hydrogen. This invention contemplates three embodiments hereof.

In a first embodiment, hydrogen to power the engine is supplied onboard by a bed of iron that is made to react with water in the presence of an alkali hydroxide catalyst at temperatures not exceeding approximately 250° C. The preferred alkali hydroxide is the hydroxide of potassium in a range of concentrations between 50 to 60 percent by weight, with the preferred concentration being about 53%. The hydrogen for powering the heat engine is generated onboard the automobile in situ, by using a reactor compartment containing the iron materials. The hydrogen is generated by passing a solution of alkali hydroxide over the iron, which then becomes iron oxide. The vehicle's operator obtains a fresh charge of the iron materials from an iron fuel station for placement in a storage compartment of the vehicle which feeds the reactor compartment. The exchange of the iron oxide with a fresh iron charge at the fuel station can function in a manner that is similar to that of the current process for returning empty soda cans to a supermarket, except that the process at hand is automated, as at gasoline pumping stations. For the spent iron (iron oxide), the fuel station would give the vehicle operator a cash allowance toward the purchase of a new iron charge. The old, spent iron would then be recycled into fresh iron by a reduction process at the fuel station or at a central distribution facility.

The iron materials of the second process of this invention may comprise in situ freshly-ground particulates which enhance the $H_2O$-iron reaction. The freshly ground particles range in diameter size from approximately 25 to 1,200 µm; an average-sized distribution is one in which at least twenty percent (20%) of the particles are less than 300 µm in diameter. It is preferable that at least 50% are less than 300 µm in diameter. The average particle density ranges from approximately 1 to 7.8 g/cc, with a non-compressed packed particle density ranging from about 1.5 to 3.5 g/cc. The particles have a surface area greater than approximately 0.001 meters²/g.

It is also contemplated that a third embodiment may combine the freshly-ground iron process with the catalyst process.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features three embodiments of a method of powering a vehicle by using hydrogen as fuel. The hydrogen is generated in situ, onboard the vehicle, and is used to power a standard heat engine that has been modified to run on hydrogen gas. Such hydrogen is generated by passing low-temperature heated alkali hydroxide solution or low-temperature steam over an iron bed contained in a reactor. The iron is bulk-loaded into the vehicle. In one embodiment, it is freshly-ground in situ into particles of iron. In another embodiment, the iron is caused to react with the water in the presence of an alkali hydroxide catalyst, which allows the reaction to proceed at temperatures below about 250° C. A third embodiment contemplates the combination of the first and second embodiments herein.

Figure 1:
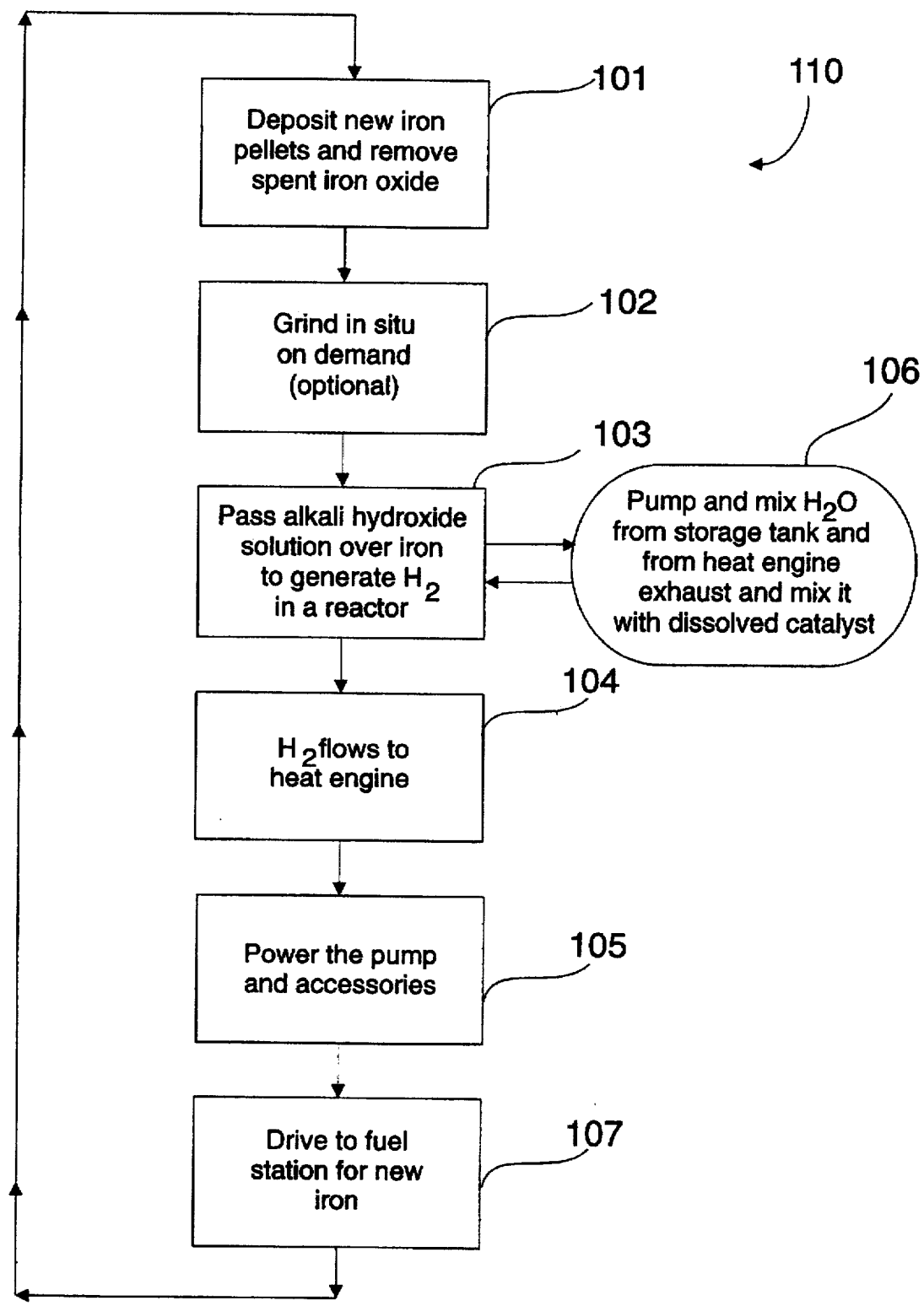
FIG. 1 illustrates a flowchart diagram of a method using the inventive catalyst of this invention.

Now referring to FIG. 1, a flowchart diagram 110 of the inventive method is shown. Consider an automobile, not shown, having a modified heat engine that is powered by hydrogen obtained in situ from an iron fuel-and-water reaction. The heat engine can be designed for hydrogen power, utilizing a standard Otto cycle. The fuel for generating the hydrogen is made of iron. A fresh charge of iron is obtained from a fuel station, step 101. The spent iron (iron oxide) that is in the iron oxide bin is removed and a fresh charge of iron particles or pellets is supplied. The iron may be further enhanced in its reactivity with water by the periodic grinding of the iron particles in situ, step 102. This enhanced reactivity of the iron, which increases the reactivity of the iron-$H_2O$ reaction, is one embodiment of the process of this invention. In another embodiment, the catalytic reaction of this invention proceeds at desirable conversion rates, and at desirable temperatures, without the need to grind the iron. In a third embodiment, the two processes may be combined. The reactor containing the iron can also be tumbled, so as to mix or stir the iron.

The vehicle is equipped with a heat engine that internally combusts hydrogen to produce mechanical power. The hydrogen is generated in situ by passing heated water (containing an alkali hydroxide catalyst) at typically between approximately 230° C. to 250° C. over the iron deposited in the reactor, step 103. The grinding of the iron within the compartment (step 102) can be optionally used, either alone or in combination with the catalyst process. The grinding of the iron makes the iron more reactive, so that the conversion of the iron to iron oxide, which is measured in percent per minute (%/min.), can take place at lower-than-normal water temperatures and at better-than-normal conversion rates, as illustrated below in Table 1, without the catalyst being present.

TABLE 1

(No Catalyst)

| $H_2O$ Temp. (°C.) | Conv. Rate (Ground) | Conv. Rate(Unground) |
|---|---|---|
| 400 | 11.5 | 3.7 |
| 300 | 4.0 | 1.8 |
| 200 | 2.4 | 0.8 |

The alkali hydroxide catalyst used to enhance the reaction is preferably the hydroxide of potassium in a concentration in the approximate range of between 50 and 60% by weight. It should be understood that, while the other alkali hydroxides are effective catalysts, the use of the hydroxide of potassium is preferred. The hydroxides of cesium, rubidium and lithium are too expensive. The hydroxides of sodium and lithium form excessively stable ferrates with the iron, which is undesirable, because stable ferrates are difficult to decompose. They also reduce the amount of catalyst in solution. The formation of these excessively stable ferrates, therefore, poses problems in the replenishment of the catalyst, with attendant inconvenience and the additional costs of labor and materials. Other alkali hydroxides, however, can be used in some cases with the potassium hydroxide. The reaction is preferably conducted at temperatures ranging between approximately 200° C. and 250° C., as shown by the conversion rate in Table 2 hereinbelow.

The preferred concentration of the potassium hydroxide catalyst of this invention is approximately 53 grams of potassium hydroxide per 100 grams of solution.

At this concentration, operating at 235° C., a given quantity of commercial sponge iron powder reacts with $H_2O$ to form iron oxide at a per-minute conversion rate of 3.62%. This rapid conversion rate (measured in percent per minute) makes practical the use of iron to fuel automobiles and other land vehicles.

TABLE 2

| Temp. °C. | Catalyst Type | Concentration | Conversion Rate |
|---|---|---|---|
| 230 | KOH | 56.2 | 2.02%/min. |
| 230 | KOH | 53.3 | 2.76 |
| 245 | KOH | 53.3 | 2.62 |
| 235 | KOH | 53.3 | 3.62 |
| 230 | NaOH | 53.0 | 0.98 |
| 235 | NaOH | 49.0 | 1.00 |
| 200 | NaOH | 60.0 | 0.60 |
| 230 | NaOH | 60.0 | 0.95 |

The generated hydrogen flows to the heat engine, step 104, where it is internally combusted to generate power, along with a water by-product. This by-product water is pumped via pump 20 to the heat exchanger 17 in order to replenish the water in the alkali hydroxide solution circulating in and out of reactor 15. Additional water is periodically added to tank 18 so as to maintain a proper supply level and is also mixed with the catalytic alkali hydroxide solution, step 106. An alternator that is powered by the heat engine can generate electricity for the battery used to provide the spark to combust the hydrogen. The pumps and the accessories of the system can be powered by the battery, step 105. The operator of the vehicle eventually drives to the fuel station to obtain a new charge of iron, step 107, when the majority of the fuel (iron) has been spent (i.e., converted to iron oxide). The automotive power process is then essentially repeated.

Figure 2:
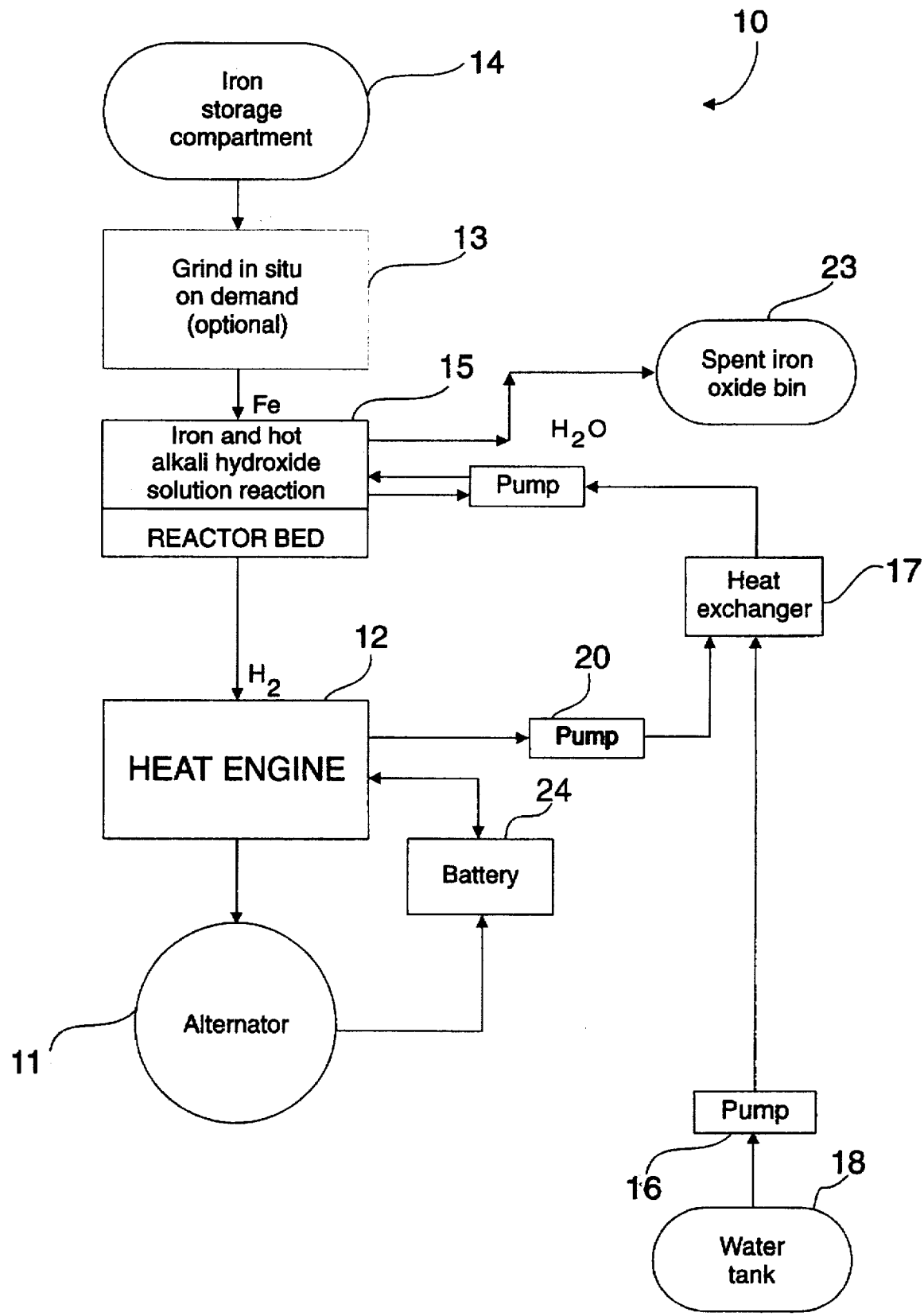
FIG. 2 depicts a schematic diagram of the system of a hydrogen-powered vehicle that utilizes the new catalyst of the invention.

Referring to FIG. 2, a schematic diagram 10 of the system for a hydrogen-powered vehicle utilizing this invention is shown. The vehicular system comprises a heat engine 12 that receives electrical energy from a battery 24 and hydrogen fuel from a reactor 15. The iron from an iron storage compartment 14 is fed to an iron bed disposed in the reactor 15. A grinding apparatus 13 can refresh the iron fed from the iron storage compartment 14 to the reactor 15. Water is pumped from a water tank 18 via pump 16 to the iron bed 15 via a diluter (not shown). The water is heated to the proper temperature from recovered waste heat obtained from the heat engine 12 via heat exchanger 17. The water is pumped (via circulating pump 19) and recirculated to the diluter (not shown) and from there to the iron bed of reactor 15. The hydrogen that is produced in reactor 15 flows to the heat engine 12, in order to produce power via internal combustion. Additional water must be periodically added to tank 18 so as to maintain a proper supply level. The electricity produced by the alternator 11 driven by the heat engine 12 is used to charge the battery 24. The electricity of battery 24 is used to power the respective pumps 16, 19, and 20, as well as the grinding apparatus 13. (For purposes of clarity, suitable electrical connections among battery 24 and electrically-driven components are not shown in FIG. 2.)

A spent-iron bin 23 receives the iron oxide from the reactor 15. The spent iron is emptied periodically, usually at the time of refueling.

The reactor 15 generally comprises one or more tubes, not shown, that are filled with a porous or powdered metal. The tubes are preferably made from materials that conduct heat, although in certain embodiments of the present invention (whereby start-up heat is generated internally, such as by air injection), heat-conductive materials are not necessary. Preferably, the tubes are made from materials such as inconel, stainless steel or Teflon®. The size of the tubes will, of course, depend upon the size of the generating system. However, they generally have an inside diameter of at least about ¼ inch (0.635 cm) and a length of at least about 6 inches (15 cm). The number of tubes will also vary, depending upon the size of the system. The general range is from about 1 to 100 tubes; the more preferable range is from about 1 to 5. The tubes may also be of varying sizes and shapes (including curves, spirals, etc.). The tubes may also be disposed at various angles.

The iron materials of this invention can comprise in situ freshly-ground particulates. The particles range in diameter size from approximately 25 to 1,200 μm; an average-sized distribution is one in which at least twenty percent (20%) of the particles are less than 300 μm in diameter. It is preferable that at least 50% are less than 300 μm in diameter. The average particle density ranges approximately from about 1 to 7.8 g/cc, with a non-compressed packed particle density ranging from about 1.5 to 3.5 g/cc. The particles have a surface area greater than approximately 0.001 meters²/g.

To initiate the reaction, the water in the container 18 is heated. The water flows into and reacts with the metal reactant to produce a metal oxide, such as $Fe_3O_4$, and hydrogen gas.

One way to start the hydrogen-producing reaction is to inject catalyzed solution and air into the reactor zone, so that the rapid oxidation of the metal and the catalytic burning of the hydrogen (produced by the reacting water) will help heat the metal reactor up to the necessary temperature for reaction. Another way to supply the necessary start-up heat is to burn a small amount of conventional fuel (such as compressed natural gas, propane or gasoline) in a separate burner, employing a suitable means to transport the generated heat. A simple source of start-up heat may be a small storage battery that furnishes power to a heating bulb or heating coil that is disposed within or adjacent to the energy-producing device.

A more complex scheme for supplying start-up heat to the reactor zone is to employ a plurality of reactor beds in the reaction zone (such as elongated tubes of metal reactant), with at least either one small reactor bed or a number of beds of graduated sizes. The smallest bed is brought up to operating temperature first with a battery or a small burner; the hydrogen it produces is burned with air to form water, so as to heat up the larger reactor beds.

In the case of beds of graduated sizes, the hydrogen produced by the next larger bed may be used to heat up the next larger bed, etc.

One of the advantages of the present invention over other hydrogen production systems (including metal-hydride-based systems) is its ability to regenerate or reform the spent metal oxide after completion of the reaction and the production of hydrogen. This advantage is even more significant because of the relatively low cost involved in the regeneration of spent metal oxide. The system of the present invention may employ a variety of methods to regenerate the spent metal oxide, some of which are already commercially in use.

One method of regeneration comprises reacting the spent metal oxide with a reducing gas, a mixture of gases or a liquid. Because of its relatively low cost, the presently preferred reducing agent is reformed natural gas. This gas generally comprises a mixture of hydrogen, carbon monoxide, carbon dioxide and residual steam. While hydrogen and carbon monoxide are the only active reducing agents, the metal/metal oxide bed that is being regenerated is not irreversibly harmed by the presence of the other two components. If hydrogen gas is available at a lower cost than reformed natural gas, it, too, could be used. In most cases, heat is added to the reaction, because the regeneration process is somewhat endothermic. Where available, relatively pure carbon monoxide can also be used as a reducing agent.

The gaseous reducing agents may be supplied as a reformed liquid fuel such as reformed methanol, reformed ethanol, reformed petroleum derivatives and reformed or decomposed ammonia.

The reformed fuels may be derived by various techniques including: (1) steam-reforming (in which the fuel in gaseous form reacts with steam); (2) partial oxidation (in which the fuel reacts with oxygen or air in proportions less than that needed for complete oxidation); or (3) autothermal reforming (in which the fuel partially reacts with steam and partially with oxygen or air). In terms of yield of hydrogen per unit of fuel, steam-reforming is more efficient than partial oxidation. Steam-reforming is endothermic, while partial oxidation is exothermic. With regard to both hydrogen yield and heat addition/removal, autothermal reforming falls between steam-reforming and partial oxidation. The selection of a particular reforming process will thus be made for a particular operation based upon factors which include the hydrogen yield required, equipment costs and complexity, and the overall process heat requirements.

Heat must be supplied to the reduction reaction, since the reduction reaction is generally endothermic, taking place at about 800° C. to 1,1002° C. One method of doing this is to inject air or oxygen into the reactor bed. This causes some of the reducing agent to burn, thereby heating up the regeneration reaction zone, i.e., autothermal reforming. Another method is to burn the vent gas from a hydrogen-producing reaction and transfer its combustion heat to the regeneration reaction zone through the walls of the reactor. Still another method is to burn part of the reducing agent upstream of the reforming device and transfer the combustion heat across the reactor bed walls of the metal/metal-oxide containing reactor. Still another scheme for supplying the necessary heat to maintain the regenerating reaction is to burn vent gas from another nearby regenerating bed. This vent gas normally contains steam, carbon dioxide and unreacted reformate. The best method, however, is to use a heat exchanger that takes advantage of the engine's waste heat and delivers the waste heat to the reactor.

In general, the vent gas from the reaction between iron oxide and reformate does not only produce a mixture of water and carbon dioxide. The equilibrium composition of the vent gas also includes unreacted hydrogen and unreacted carbon monoxide. Some of the unreacted reducing mixture can be burned, so as to satisfy the endothermic need of either the iron oxide reaction or the reformer reaction, but if all of it were burned or vented, the overall efficiency would go down. To avoid this, some water may be condensed from the vent gas; the resulting, drier mixture may then be fed to a second-stage iron oxide regenerator to produce more elemental iron. The vent gas of the second stage would then be burned to provide the needed endotherms, and the overall efficiency would be better than that of a single-stage regenerator.

The reformation process may be carried out at a location away from the fuel station, such as at a central plant. The metal and spent metal oxides may be transferred to and from refueling stations near the site of the central station. The metal powder or material is preferably conveyed into and out of the metal-water reaction chamber 14 during refueling by a suitable means, such as gravity flow. The metal and metal oxides are transferred from the refueling stations to the central reforming plant by a variety of means (including trucking, railroad car and the like). The recycling of the metal reactant can theoretically occur an infinite number of times.

As an alternative to using a relatively large, removed central processing facility for reforming the spent metal oxide, smaller reformer units at the site of the refueling station may be used. As with the centralized reforming unit, the on-site reforming units may be used to convert the spent metal oxide to metal reactant (as previously described) by using, for example, reformed natural gas. The reduced metal may then immediately be used to generate hydrogen in a hydrogen-powered device; stored for subsequent use to generate hydrogen in such a device; or used as an intermediate storage device, in conjunction with metal hydride storage beds. A convenient way to utilize the reduced metal as an intermediate storage device in combination with a metal hydride bed is to react the reduced metal with steam to produce slightly wet hydrogen. The hydrogen is then dried by suitable means known in the art, such as by desiccants.

A small amount of hydrogen generated from the iron-water reaction can be compressed and stored for start-up/heat-up purposes. The hydrogen is diverted by means of a solenoid valve that is controlled by a pressure sensor or pressure switch. The hydrogen storage device acts like a storage battery, supplying energy during start-up and absorbing it during normal driving for later use.

During the regeneration of spent metal oxide, the reformed natural gas may contain sulfur impurities, which may accumulate in the bed over many regeneration cycles. The sulfur will react with the metal reactant, creating metal sulfides. The metal sulfides might not decompose either by steam upon discharge or by fuel or reformate upon recharge. This will eventually irreversibly tie up a large fraction of the metal reactant bed as metal sulfides instead, thereby preventing it from switching from metal oxide to elemental metal. In order to overcome this contamination problem, unwanted metal sulfide (e.g., FeS) can be converted to sulfur dioxide ($SO_2$) and some metal oxide (e.g., one of the iron oxides) by briefly (i.e., in 1 to 15 minutes) passing a stream of air over the heated bed of spent metal oxide before that bed is reduced to elemental metal. Since the bed must be heated anyway, in order to regenerate it, little or no additional heating is needed to remove the metal sulfide by hot air oxidation. The risk of explosion during transition through the bed from air to reformate or fuel can be significantly reduced by briefly purging the bed with low-temperature steam, carbon dioxide, nitrogen or any other suitable inert gas. In particular, the mixture of low-temperature steam and $CO_2$ from another bed undergoing regeneration is a readily available, essentially cost-free, purging agent.

Since other modifications and changes varied to fit particular operating requirements and environments (such as the use of hydrogen generated by the aforementioned methods for supplying a fuel cell) will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An improved $H_2O$-iron reaction method, comprising reacting $H_2O$ and iron material to form hydrogen in situ, aboard an automotive vehicle having a heat engine that is designed to internally combust hydrogen, the $H_2O$-iron reaction taking place in the presence of a catalyst comprising a dissolved alkali hydroxide, said iron material comprising particles or pellets of iron, said particles being bulk-loaded into a reactor chamber, said alkali hydroxide enhancing said $H_2O$-iron reaction.

2. The method in accordance with claim 1, wherein said iron material comprises particles ranging in diameter size from approximately 25 to 1,200 μm, with an average-sized distribution having at least twenty percent (20%) of the particles less than 300 μm in diameter, and having an average particle density ranging from approximately 1 to 7.8 g/cc, and a surface area greater than approximately 0.001 meters$^2$/g.

3. The method in accordance with claim 1, wherein said alkali hydroxide catalyst is potassium hydroxide.

4. The method in accordance with claim 3, wherein said potassium hydroxide is in a concentration of approximately 50–60% by weight.

5. The method in accordance with claim 4, wherein said potassium hydroxide is in a concentration of approximately 53% by weight.

6. The method in accordance with claim 1, wherein said particles are freshly ground in situ aboard the vehicle.

7. The method in accordance with claim 1, wherein said iron particles have a non-compressed packed particle density ranging from about 1.5 to 3.5 g/cc.

8. The method in accordance with claim 1, wherein at least 50% of the particles are less than 300 μm in diameter.

9. The method in accordance with claim 1, wherein said iron particles comprise a bulk-loading of particles or pellets for use as a refresher charge in said vehicle.

10. An improved $H_2O$-iron reaction method, comprising reacting $H_2O$ and iron material to form hydrogen in the presence of a catalyst, for fueling an automotive vehicle having a heat engine, said catalyst comprising a dissolved alkali hydroxide, said iron material comprising bulk-loaded particles or pellets of iron which are then freshly ground for enhancing reactivity of the iron material in producing hydrogen, said alkali hydroxide enhancing said $H_2O$-iron reaction by allowing said reaction to proceed at temperatures below approximately 250° C.

11. The method in accordance with claim 10, wherein said iron material comprises particles ranging in diameter size from approximately 25 to 1,200 μm, with an average-sized distribution having at least twenty percent (20%) of the particles less than 300 μm in diameter, and having an average particle density ranging from approximately 1 to 7.8 g/cc, and a surface area greater than approximately 0.001 meters$^2$/g.

12. The method in accordance with claim 10, wherein said alkali hydroxide catalyst is potassium hydroxide.

13. The method in accordance with claim 12, wherein said potassium hydroxide is in a concentration of approximately 50–60% by weight.

14. The method in accordance with claim 13, wherein said potassium hydroxide is in a concentration of approximately 53% by weight.

15. The method in accordance with claim 10, wherein said iron particles have a non-compressed packed particle density ranging from about 1.5 to 3.5 g/cc.

16. The method in accordance with claim 10, wherein at least 50% of the particles are less than 300 μm in diameter.

17. The method in accordance with claim 10, wherein said iron particles comprise a bulk-loading of particles or pellets for use as a refresher charge in an automotive vehicle.

18. An improved $H_2O$-iron reaction method, comprising reacting $H_2O$ and iron material to form hydrogen in situ, aboard an automotive vehicle having a heat engine that is designed to internally combust hydrogen, said iron material comprising particles or pellets of iron, said particles being bulk-loaded into a reactor chamber, said $H_2O$-iron reaction being enhanced by grinding said iron material in situ aboard said automotive vehicle, said reaction between said $H_2O$ and said iron proceeding at temperatures below approximately 250° C.

\* \* \* \* \*